United States Patent [19]

Ruskin

[11] 4,066,165
[45] Jan. 3, 1978

[54] STAPLES AND PRODUCTION METHODS

[76] Inventor: Henry Ruskin, 21 Normahagen Court, Cranford, N.J. 07015

[21] Appl. No.: 694,897

[22] Filed: June 10, 1976

[51] Int. Cl.² .............................................. B65D 85/24
[52] U.S. Cl. .................................... 206/340; 29/413; 85/49; 59/71; 59/75; 113/116 Y
[58] Field of Search ..................... 29/413, 414, 527.4, 29/469.5, 460; 113/116 Y, 116 BB; 85/49; 59/71, 72, 73, 74, 75, 76, 77; 206/340, 820

[56] References Cited

U.S. PATENT DOCUMENTS

| 2,021,274 | 11/1935 | Vogel | 85/49 X |
| 2,125,211 | 7/1938 | Vogel | 59/77 |
| 2,703,402 | 3/1955 | Forrester | 85/49 X |
| 2,943,436 | 7/1960 | Peterssen | 59/77 |
| 3,936,624 | 2/1976 | Anderson et al. | 29/630 E X |

FOREIGN PATENT DOCUMENTS

| 147,978 | 3/1950 | Australia | 85/49 |
| 985,012 | 3/1965 | United Kingdom | 85/49 |

Primary Examiner—Victor A. DiPalma

[57] ABSTRACT

Novel glue-less staples are formed economically of sheet metal having essentially abutting but parted margins, the staples being joined to one another by localized integral connections along the margins. The connections can be of controlled size and their weakness can be controlled by mechanical working of the metal. As a specific feature, the connections can be formed to provide the standard bond strength found in glued rows of staples, so that the novel strips of staples can be made for use in conventional tackers and staplers.

19 Claims, 33 Drawing Figures

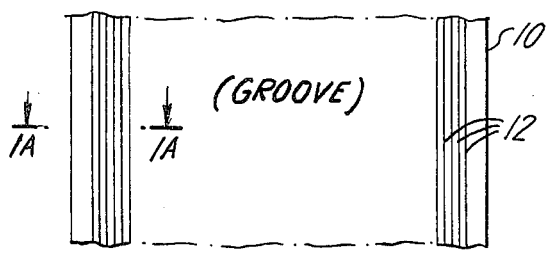
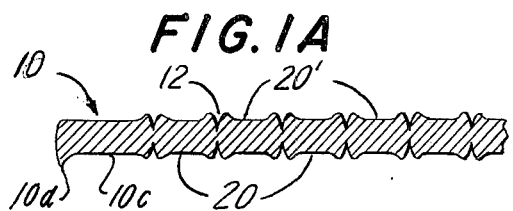
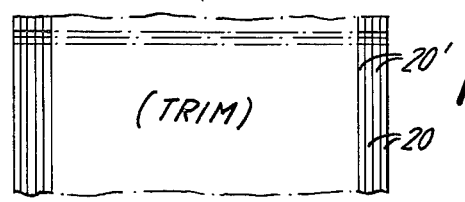
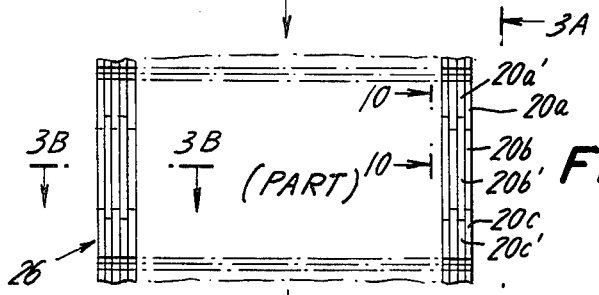
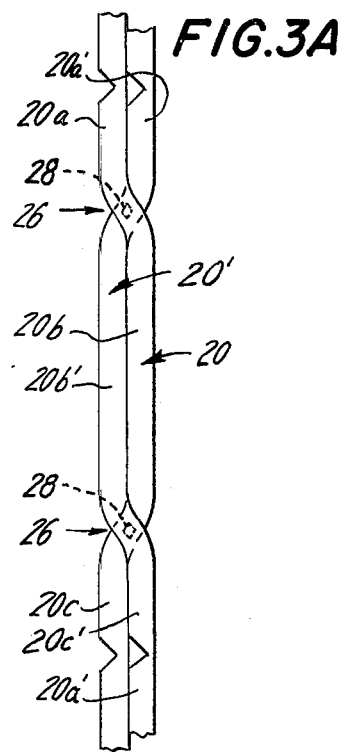
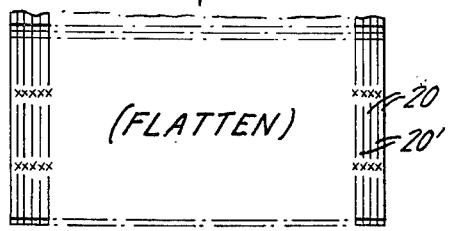
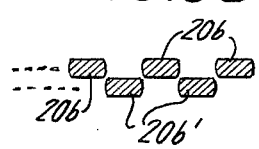
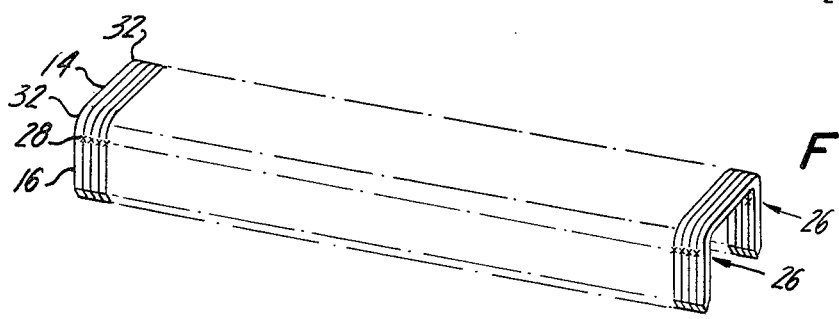

FIG.7 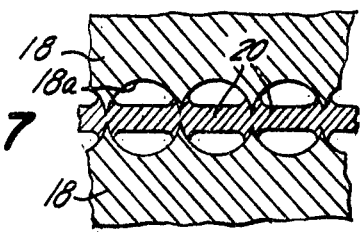
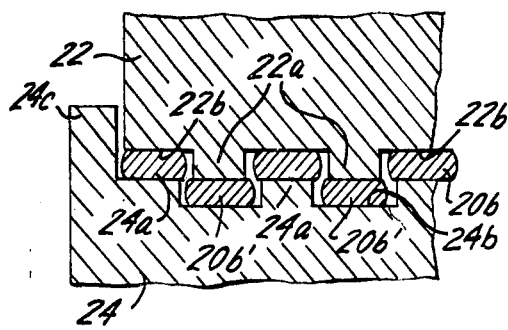
FIG.9 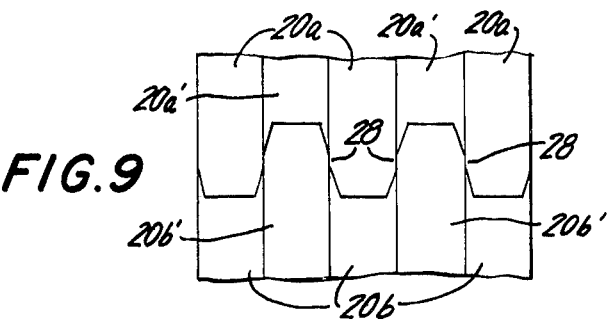
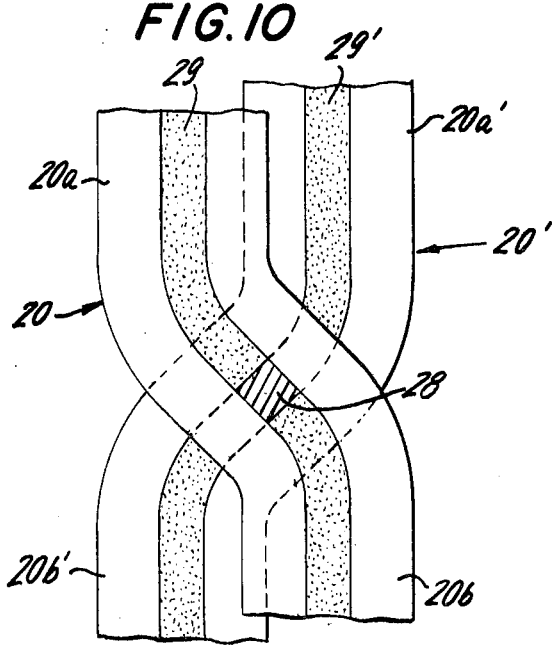

STAPLES AND PRODUCTION METHODS

The disclosed method of making the novel staples includes making grooves in sheet metal to delineate adjoining margins of a row of staples. Side-by-side elongated portions of adjoining staple elements are shifted out of surface alignment in relation to each other sufficiently to part the reduced thickness of metal at the bottom of the grooves, leaving small connections between adjacent staples, preferably at two locations along each staple. Ideally, elongated side-by-side first portions of neighboring staples are shifted out of relative surface alignment in one sense and elongated next-succeeding portions of those staples close to the ends of the first portions are shifted out of surface alignment in the opposite sense, so that tiny twisted connections of controlled cross-section are left between neighboring staples. The relatively shifted staple portions are restored essentially to surface alignment by flattening the strip. This step reversely twists and further weakens the connections between the staples; and the strip of staples may be bent variously as required to adapt it for use in various conventional staplers and tackers.

FIELD OF THE INVENTION

This invention relates to staples and to methods of making staples. As used here, the term "staples" includes the kind of articles widely made of wire, of uniform round or flattened cross-section from end to end, and it includes other articles of sheet metal having prongs projecting from opposite ends of a crown, where the crown may be as wide as or much wider than the prongs.

BACKGROUND OF THE INVENTION

Two broad methods have been used for making strips of staples. One method involves making wire, forming the wire into individual staples, and uniting the separate staples into a strip by a readily severable tape and adhesive, or into a stick by means of glue. All such staples involve the high cost of producing the wire, and the added cost of the joining materials. In the case of glue, there is a latitude of uncertainty that leads to unintentioned fracturing of a stick of staples into smaller and sometimes useless, often troublesome, pieces. In any case, glue and tape of various kinds sometimes accumulates in a stapler or a tacker, occasionally causing the tool to jam and in some cases requiring periodic cleaning.

According to a second method, strips of staples are formed of sheet metal, each staple beig delineated from its neighbors by grooves or slots leaving connections of reduced cross-section joining the staples, compared to the cross-section of the sheet metal along the common margins of adjacent staples. The strength of such connections is enormously greater than anything encountered in glued staples. As a result, devices used to apply such staples commonly have cutting edges for separating each successive staple from the supply, and the driving power available in such staple-driving devices must be large enough to allow for the severing effort.

An object of the present invention resides in the provision of novel glue-less strips of staples having integral connections between the staples but which are parted from each other except at tiny points of connection, comparable in bond strength to that found in glued staples.

A further object of the invention resides in the provision of novel integrally connected strips of staples of dimensions commonly provided heretofore by making separate staples of formed wire and then joining the staples.

A further object of the invention is to provide novel strips of staples joined to one another by integral connections much smaller in cross-section than the squared thickness of the metal forming the staple, measured perpendicular to the top surface of the strip of staples.

A still further object of the invention resides in novel methods of producing strips of integrally connected staples starting with sheet metal. A specific object is to provide methods of making strips of staples out of sheet metal, where the successive staples have integral connections much smaller than the square of the thickness of the sheet metal.

A further object of the invention resides in novel methods of producing strips of staples having integral connections whose strength approximates the strength of conventional separate staples held together by glue.

A still further object of the invention resides in novel methods of making readily separable staples of sheet metal, the staples having dimensions commonly provided heretofore by making separate staples of wire thereafter united as by means of glue. A further object is to make staples out of sheet metal where the margins of the staples are free of burrs.

SUMMARY OF THE INVENTION

In the illustrative embodiment of the invention detailed below, a piece of sheet metal is grooved to delineate common margins of adjoining staples, and the metal remaining at the grooves is parted along most of its length by forcibly shifting laterally adjacent portions out of surface alignment with each other sufficiently to effect parting, in such a way as to leave the adjoining staples joined at isolated locations along the grooves.

In a more detailed aspect of the invention, first elongated side-by-side portions of neighboring staples delineated by grooves in the sheet metal are shifted out of surface alignment with each other in one sense, and second elongated side-by-side portions of those staples closely adjacent endwise to the first portions are shifted out of surface alignment with each other in the opposite sense so as to leave a twisted connection between the first and second portions of the neighboring staples. This connection is much smaller in cross-section than the squared thickness of the sheet metal.

The novel strips of staples ideally have two localized connections between each staple and its neighbor. These two connections are best formed by shifting first elongated side-by-side portions of neighboring staples out of surface alignment with each other in a first sense sufficiently to part them, shifting second elongated side-by-side portions of the neighboring staples out of surface alignment with each other in a second sense opposite to said first sense, and shifting third elongated side-by-side portions of the neighboring staples out of surface alignment with each other in the first sense, the first, second and third portions of each staple being close to one another so that two tiny twisted connections remain between each staple and its neighbor.

Under special circumstances the staples can be used in the form developed after relative shifting of the elongated portions as indicated above broadly or specifically. However, as a still further feature, the relatively shifted portions of the staples are restored essentially to their original surface alignment with each other, in this way to simulate conventional strips of staples. This operation reversely twists and thereby further weakens the connections between adjacent staples, and disposes the parted margins of adjoining staples essentially in abutment with one another.

Further operations, as may be appropriate, convert the strip of staples resulting from the operations described above into rolled strips of staples or into straight sticks of staples each bent into U-shape. As a distinctive but detailed feature of novel sticks of U-shaped staples, there are two tiny connections between each staple and the next in a row, one such connection at each side of the U-shape.

In staple sticks of this configuration, ideally the tiny integral connections between neighboring staples are disposed along margins of the prongs of the staples, where the total force applied to the crown is transmitted along the prongs for effectively and dependably parting the connections when each staple is to be used, without absorbing any large part of the staple-driving effort.

The nature of the invention including the foregoing and other objects, novel features and advantages will be appreciated more fully from the following detailed description of the presently preferred embodiment of the invention, shown in the accompanying drawings, illustrating the novel aspects. It will at once be apparent that certain of the novel features which are used together for exemplary results can be used without other novel or conventional features. It will also be apparent that the several novel aspects and features can readily be modified and variously applied. Consequently, the invention should be construed broadly in accordance with its full spirit and scope.

DESCRIPTION OF THE DRAWINGS

FIGS. 1-5 are fragmentary plan views showing the progressive conversion of a strips of metal into a stick of staples, as an embodiment of certain features of the invention;

FIG. 1A is an enlarged fragmentary cross-section of the strip in FIG. 1 at the plane 1—1 therein;

FIG. 3A is an enlarged fragmentary side view of the strip of FIG. 3;

FIG. 3B is an enlarged fragmentary cross-section of the strip of FIG. 3 as viewed at the plane 3B—3B;

FIG. 6 is an enlarged perspective of the staple stick of FIG. 5;

FIG. 7 is a fragmentary enlarged cross-section of grooving rolls and a metal strip corresponding to FIG. 1;

FIG. 9 is a greatly enlarged fragmentary top plan view of the strip of FIG. 3;

DETAILED DESCRIPTION

Figure 7A:
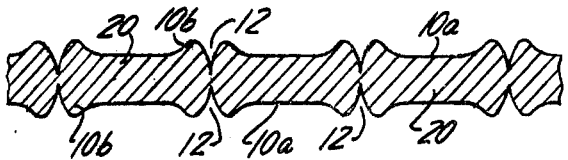
FIG. 7A is a greatly enlarged cross-section of the metal strip of FIG. 7.

Referring now to the drawings and in particular to FIGS. 1-6, a strip of sheet metal 10 as of steel, for example SAE 1010 cold-rolled low carbon steel, hard aluminum or monel metal, has a thickness equalling or slightly less than the final thickness of the desired staples (FIG. 6) measured perpendicular to the top or the side of the stick shown in FIG. 6. Longitudinal grooves 12 are formed in the strip, spaced apart a distance equal to the width of each staple as measured along the row. In an example, the strip is 4⅜ inches wide, and the grooves are 0.050 inch apart. These dimensions relate to a staple whose crown 14 is 7/16 inch long and having prongs each of which is 9/16 inch long. Typically, staples of the form illustrated in FIG. 6 may be made of sheet metal having a thickness in the range of about 0.018 inch to 0.020 inch.

The grooves 12 are preferably formed by rolling. In one distinctive application of features of the invention, rolling dies 18 are used (FIG. 7) having sharp edges separated by channels 18a, to produce two sets of grooves in the opposite surfaces of the sheet metal, the opposite grooves being aligned with each other. Channels 18a in an example have a cross-section comprising about 150° of a circle having a radius of 0.0255 for making grooves 0.050 apart. The grooves are deep enough to reduce the thickness of the remaining metal to about one-third or one-fourth of its original thickness. The resulting cross-section typically resembles that shown greatly enlarged in FIG. 7A. Metal is forced to rise out of the starting surfades 10a and to flow laterally, creating smooth ribs 10b. For the illustrative example stated above, with grooves 12 spaced 0.050 inch apart in sheet metal 0.020 inch thick and with the residual thickness of metal between the grooves about 0.006 inch made by the described circular-grooved rollers, appreciably more than half the width of the staple is not measurably disturbed by the grooving operation. One advantage of this condition is that pre-painted metal strips can be used without the paint being removed. With paint applied with usual care to alloy aluminum commonly used for building siding, even the raising of ribs 10b did not induce chipping or flaking of the paint. In this way, painted and pre-printed sheet metal can be used to produce sticks or belts of staples bearing the desired decoration.

As an alternative to rollers 18, reciprocating dies can be used for forming the grooves, and in broader concept grooves may be cut as in a shaving operation. Especially in contrast to the latter, the cold-flow type of operation for forming grooves as described has many advantages among which are: conservation of material; mechanically worked stronger, stiffer prongs produced using a given thickness of sheet metal; longer tool life with minimized attention to maintenance; and smoother lateral surfaces in the resulting staples.

The cross-section of strip 10 is shown, in part, in FIG. 1A. There it is seen that grooves 12 leave a marginal strip 10c whose width is minimal but which is trimmed away so that burr 10d can be eliminated. Burr 10d is inherently present as a result of the slitting operation usually involved in providing strip 10 of the desired width. In the present example, the supplied strip is slightly wider than the desired length of the completed stick of staples (FIG. 6). This trimming step is preferably performed by a parting operation like that which is used for parting the staples incompletely from each other (now to be described) since this method avoids creating a new burr. Indeed, as an alternative (depending on the tooling used), the parting of the scrap margins can be performed in the same operation as that which is used for parting the staples incompletely from each other.

FIGS. 3, 3A, 3B and 7-10 illustrate the presently preferred method of parting the staples in a manner that is particularly effective for yielding staples whose side surfaces are smooth and free of sharpness. Each slender metal element 20 between the grooves is subjected to a pressing operation, for example, to create portions relatively shifted out of surface alignment with each other. In FIG. 3A, first and third end portions 20a and 20c of staple 20 are shifted in one direction perpendicular to the sheet metal and out of the original sheet-metal surface and first and third end portions 20a' and 20c' of the neighboring staple 20' are shifted equally in the opposite direction out of alignment with the original sheet-metal surface. At the same time, center portion 20b of staple 20 is shifted in said opposite direction perpendicular to the sheet metal and out of the original sheet-metal surface, while center portion 20b' is shifted in said one direction perpendicular to the sheet metal and out of the original sheet-metal surface. Stated differently, end portions 20a and 20c are shifted relative to and out of surface alignment with end portions 20a' and 20c', respectively, in one sense; and center portion 20b is shifted relative to and out of surface alignment with center portion 20b' in the opposite sense. This operation can be effected as in FIGS. 22-24 by shifting portions 20a, 20b and 20c out of the plane of the sheet metal, leaving portions 20a', 20b' and 20c' undisturbed, or portions 20a, 20b' and 20c could be shifted out of the plane of the sheet metal, leaving portions 20a', 20b and 20c' undisturbed. However, it is considered far preferable to shift alternate portions of each staple and the adjacent portions of each neighboring staple equally in opposite directions from their original positions in the sheet metal. The dotted lines in FIG. 3B represent the original position of sheet metal 10 that is initially divided into elements 20 that become the finished staples.

Figure 8:
FIG. 8 is a greatly enlarged cross-section of parting dies and the metal strip corresponding to FIG. 3B.

FIG. 8 shows a pair of dies 22 and 24 that perform the relative shifting operation described above. Die 22 has a number of raised portions or ribs 22a that are slightly narrower than portions 20b' of alternate strips 20' and die 22 has grooves 22b that are slightly wider than portion 20b of a second set of strips 20 alternating with the first set. Similarly, die 24 has raised portions or ribs 24a that are narrower than portions 20b and recesses or grooves 24b that are wider than portions 20b'. Die 24 has a marginal rib 24c along each margin of strip 10, to confine and guide the strip.

The raised ribs and recesses or grooves of these two dies shift laterally adjacent portions of strips 20 and 20' out of surface alignment with each other sufficiently to part such laterally adjacent portions from each other. The metal remaining between the depths of the grooves 12 is parted by being torn or fractured by shearing stress; and as the parting operation continues, the parted surfaces tend to wipe past one another. In any case each lateral surface of an element 20a, 20b or 20c that is parted from its neighbor develops a smooth surface, the smoothness approaching that of wire. No burr is present such as that resulting from a conventional cutting or slitting operation, as discussed above in relation to burr 10d. As will be seen below, the extent of relative shifting is in part determined by the nature of the desired interconnections that are to remain between adjacent staples.

Dies 22 and 24 could be used to deform the sheet metal in the regions of portions 20b and 20b', using other similar dies in an earlier or later operation to deform the sheet metal in the regions of portions 20a and 20a', and in the region of portions 20c and 20c'. However, it is preferable to accomplish all of the parting operations concurrently through the use of one set of dies. Accordingly, where die 22 has grooves 22b to receive portions 20b and ribs 22a to displace portions 20b', die 22 also has relatively narrower ribs (not shown) aligned with grooves 2b opposite the ends of those grooves for shifting portions 20a (see FIG. 9) in the parting operation. Correspondingly, die 22 has relatively wider grooves (not shown) aligned with ribs 22a opposite the ends of those ribs for receiving portions 20a' (FIG. 9) in the parting operation. These grooves and ribs alternate along and across die 24 in like fashion, with the result that the strip of elements 20 divided by grooves 12 (FIGS. 2, 7 and 7A) becomes deformed and parted as shown in FIGS. 3, 3A, 3B, 8 and 9.

Figure 10:
FIG. 10 is a greatly magnified fragmentary cross-section of the strip of FIG. 3 as viewed at the plane 10—10.

At the places 26 (FIG. 3A) where the deformed staple elements cross each other as seen from an edge of strp 10, elements 20 and 20' remain connected to each other. The metal at these places 26 tends to remain fixed during the formation operation, and the metal of any one staple element tends to become stretched accordingly. This observation is largely incidental, for the end result would be little different if there were no stretching whatever and if, instead, the metal strips 20 and 20' near places 26 were to be drawn along the lengths of ribs 22a and 24a in forming the bowed portions 20b and 20b'. In any case, at the two places 26, each of the successive elements 20 and 20' remain united to their neighbors by integral connections 28 (FIG. 10). The term "integral" is used in different contexts to have different meanings. In this case, "integral" as it relates to "connection" signifies specifically the extension of the very metal of the discrete staple elements that are connected, the original sheet metal of which the discrete staple elements are formed. In the present usage, "integral" precludes connections formed of added material relied on to join separate elements as well as connections created in joining operations where wholly separate staple elements may be fused to each other even though no metal other than the metal of the staple elements may be involved.

FIG. 10 provides a greatly enlarged view of an integral connection 28 and illustrates the relationships between the various portions of staple elements 20 and 20' that cross at connections 28 after those portions have been parted by the relative shift of staple portions discussed in detail above. Areas 29 (stippled) represent the original thickness of the sheet metal remaining between the depths of grooves 14 after adjoining portions of the staple elements have been shifted oppositely and parting has occurred. Portions 20a and 20b of staple element 20 are separated from each other only a short distance along element 20, as is true of portions 20a' and 20b' of staple element 20'. Staple elements 20 and 20' cross each other at a prominent angle. This factor and the fact that the grooves 12 are formed in the sheet metal before the relative shifting operation occurred create a distinctive situation, namely, a controlled area of the connection 28. The crossing angle can be anything within a relatively wide range as good judgement and the desired strength of the connections dictate. Using ordinary cold-rolled steel, and using the same standards established for the strength of the connection between conventional glued staples, connection 28 should have an area of about 0.00003 square inch. For example, portions cross at about 30° to 90° to each other.

FIG. 4 shows the next step in the preferred method: The strip of grooved and incompletely parted staple elements 20 is flattened, or more precisely, the portions of elements 20 and 20' that were shifted out of the original level of the sheet metal are restored essentially into lateral surface alignment with each other. This operation may be effected in a press between hard flat and parallel plates or between smooth-faced cylindrical rollers. At this stage or at any other stage in FIGS. 1, 2 or 3 or inbetween, grooves 30 are formed across the staple elements 20 to define the ends of prongs 16. Indeed, the ends of the prongs may be formed in the very operation that separates each group of staples extending across the strip 10 from the rest of the advancing strip.

In the course of the flattening operation, the crossed relationship of the staple elements at each connecton 28 (FIG. 10) is altered. Two changes occur in the metal constituting each connection 28: a first twist occurs when the sheet metal is formed as in FIG. 10, and the metal in the connections 28 undergoes a second change, a reverse twist, when the formed strip of metal (FIGS. 3 and 10) is flattened. This twist and reverse twist constitute a kind of mechanical working that further reduces the strength of the metal of connections 28. Incidental to the flattening operation, the width of strip 10 may increase slightly, as the fractured elongated lateral edges of elements 20 and 20' shift opposite to each other. To the extent that this occurs, connections 28 are stretched slightly and thus weakened further by cold mechanical working of the metal.

The flattened groups of staples as they emerge from the operation in FIG. 4 can be fed into a stapler that erects the prongs of each staple preparatory to driving the staple. Indeed, staplers can be designed (and some may be available) that can handle the staples in their formed condition after the parting and relative shifting operation of FIG. 3, naturally after shaping the ends of the prongs in an appropriate operation. However, the present staples are adapted to wide use in the form of FIG. 6, the flattened group of staples being parted from the advancing strip and bent into channel form with prongs 16 erect at each end of each crown 14.

In concept, only one integral connection 28 would be needed to hold the staples together, as at the centers of crowns 14. Such a stick of staples would be fragile, and would readily twist about such connections; and the stick could be arched so that the top of the stick could become convex from end to end and the stick of staples could be weak for this further cause. These effects are avoided by locating connections 28 along adjoining prongs 16, as shown in FIG. 6. Stated otherwise, the parallel bends defining corners 32 are closer to each other than locations 26 at which connections 28 are developed. Moreover, when the stick of staples as in FIG. 6 is in use, the thurst of the driving blade against crown 14 is applied to the upper ends of prongs 16; and because the force is transmitted in compression along those prongs, the force is effective and dependable for breaking connections 28.

The described method of producing staples is economical in that it avoids reliance on wire that is relatively high in cost per pound as the starting material, in contrast to much less expensive sheet metal here used to produce equal number of staples. The row of staples can be produced in attractive colors and can be decorated by imprints, all formed on the sheet metal stock used in making the staples. The reliance on the integral connections for holding the staples together obviates the cost of the glue and the cost of applying the glue. All of the variables that affect the strength of the glue and the accumulation of glue in some staplers are also avoided.

Production of staples by the method as described above is more readily applicable to larger sizes of staples, and heavier staples used for tacking. Finer staples can be made in the same manner, with care to the tolerances in dies 22 and 24. FIGS. 11–14 illustrate a modification of FIGS. 3, 3B and 8 concerned with more slender staples.

Figure 11:
FIG. 11 is a greatly enlarged fragmentary cross-section of a longitudinally grooved strip illustrating a modification of the strip of FIGS. 1 and 7A.
Figure 12:
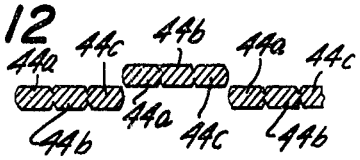
FIGS. 12-14 are greatly enlarged fragmentary cross-sections of the strip of FIG. 11 after successive parting operations, as a modification of the operation of FIGS. 3B and 8.
Figure 13:
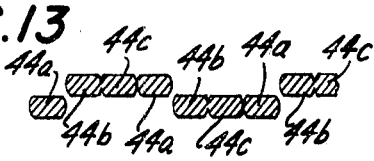
Figure 14:
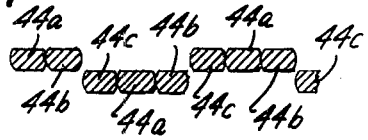

In FIG. 11, a strip of sheet metal 40, thinner than that of FIG. 7A (for example), is divided into much narrower staple elements 42 by grooves 44 in the opposite surfaces of the sheet metal. A die set precisely the same as that of FIG. 8 is proportioned to shift the various portions of the neighboring staples or staple elements 42 in groups of three: 42a, 42b and 42c, parting elements 44a and 44c as shown in FIG. 12. In a second step (FIG. 13) the elements are parted into other groups of three, this time parting elements 44a from 44b. Finally (FIG. 14) the elements are divided into still other groups of three, this time parting elements 44b from 44c. The staple elements are finished as in FIGS. 4 and 5, the thus incompletely parted groups of staples becoming sticks of staples as in FIG. 6.

Figure 15:
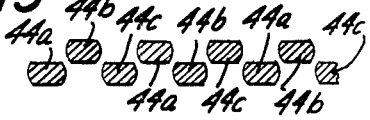
FIG. 15 is a greatly enlarged fragmentary cross-section of the strip of metal parted partially as in FIG. 12, in its fully parted condition as a modification replacing the steps of FIGS. 13 and 14.

FIG. 15 illustrates a further modification. Continuing the process started in FIGS. 11 and 12, the center staple elements 44b are parted incompletely from elements 44a and 44c by dies like those in FIG. 8. The ribs for shifting elements 44b out of surface alignment with its neighboring elements 44a and 44c are made slightly narrower than those elements 44b.

Grooves 12 along elements 20, 20' delineate the entire length of each of the margins of the finished staples to the free ends of the prongs 16, extending all along those margins including the crown and the length of both prongs. The margins of successive finished staples are essentially in abutment with each other, the abutting margins being interrupted at connections 28.

Figure 16:
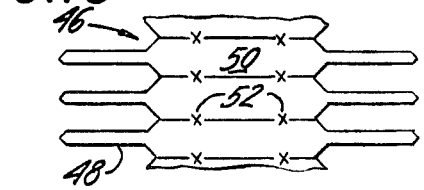
FIGS. 16 and 17 are enlarged fragmentary views of additional forms of staples as modifications of FIG. 3.
Figure 17:
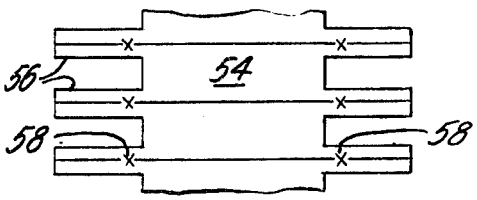

FIGS. 16 and 17 show two modifications. Staples 46 include a pair of prongs 48 projecting from opposite ends of crown 50 that is considerably wider than prongs 48. The prongs of successive staples in the row are separated by spaces formed by blanking out portions of the stock sheet-metal strip. Otherwise the process of making the staples of FIG. 16 is the same as in FIGS. 1-10. The longitudinal margins of adjacent staples are parted but essentially in abutment with each other, with connections 52 formed and proportioned as in FIGS. 1-10.

The staples of FIG. 17 including crown 54 have two prongs 56 at each end of the crown. The longitudinal margins extend all along the crown and the oppositely extending prongs and successive staples are essentially in abutment with each other all along the longitudinal margins except at integral connections 58 along the prongs. The longitudinal edges are formed by grooves, shifting various portions of the successive staples out of surface alignment with each other, etc., so that connections 58 are the same as connections 28.

Figure 18:
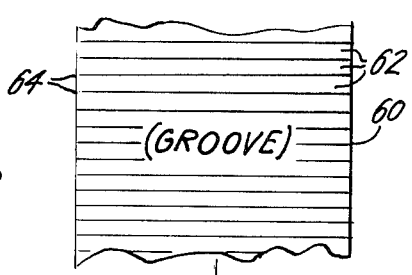
FIGS. 18-21 are fragmentary plane views showing progressive conversion of a strip of metal into a stick of staples, as a modification of FIGS. 1-5.
Figure 19:
Figure 20B:
FIG. 20B is an end view of the metal strip of FIG. 20A.
Figure 20:
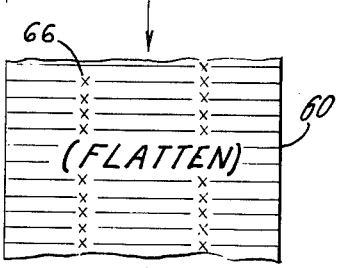

The staples of FIGS. 16 and 17 are ordinarily supplied as a roll, with the prongs projecting in opposite directions as shown. Staple drivers that are used to apply such staples have build-in provision for erecting the prongs of successive staples before each staple is applied. Those staples are produced by basically the same method as in FIGS. 1-10, modified essentially as shown in FIGS. 18-20. Of course, a blanking operation not included in FIGS. 18-20 must be added for cutting and shaping the prongs shown in FIGS. 16 and 17.

Strip of sheet metal 60 (FIGS. 18-20 and 18A) is divided into staple elements 62 by forming grooves in the sheet-metal strip extending all across the strip. These staples are proportioned the same as staple elements 20, 20' of FIGS. 1-4. The longitdinal edges of the metal strip 60 are chamfered. These edges become the free ends of the prongs of the finished staples, so that the chamfer provides sharpened penetrating ends of the prongs. It is apparent that the width of strip 60 can either be equal to the length of each staple element or its width can be any multiple of the length of a staple to form multiple strips or rows of staples side-by-side concurrently, separated by longitudinal grooves or slits. Indeed, strips of any width greater than the length of a staple element can be used, but in that case, waste strips must be removed.

Figure 18A:
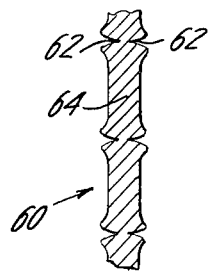
FIG. 18A is a greatly enlarged fragmentary longitudinal cross-section of the metal strip of FIG. 18.

Strip 60 (FIGS. 18-20) has aligned grooves 62 formed in its opposite surfaces as shown in FIG. 18A, thus defining a row of staples or staple elements 64. Strip 60' in FIG. 18B can be substituted, with certain inherent differences noted below. Sheet-metal strip 60' has grooves 62' in only one of its surfaces, defining staples or staple elements 64'. The grooving operation causes cold flow of the metal, resulting in smooth raised margins flanking each groove proportioned as described above and as shown in FIGS. 7 and 7A. The grooves are deep enough to leave intact about one-fourth of the thickness of the sheet metal. Rollers or reciprocating dies may be used to form the grooves. Incomplete parting of the grooved strips is performed exactly as described above in connection with FIGS. 3, 3A, 3B, and 7-10. Rows of connections 66 are formed in strip 60 in exactly the same manner as connections 28 are formed. Flattening of the strip (FIG. 20) ordinarily follows.

If sticks of staples 68 (FIG. 21) are to be produced like that in FIG. 6, the strip of FIG. 20 is divided into stick-length parts which are bent to erect the prongs. The rows of connections 66 are parallel and spaced farther apart than the bends defining the ends of the crowns.

Figure 18B:
FIG. 18B is a modification of FIG. 18A.
Figure 20A:
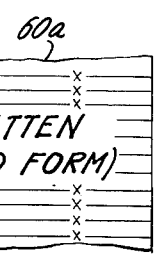
FIG. 20A is a modification of FIG. 20.
Figure 21:
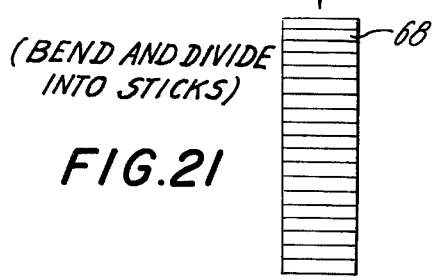
Figure 21A:
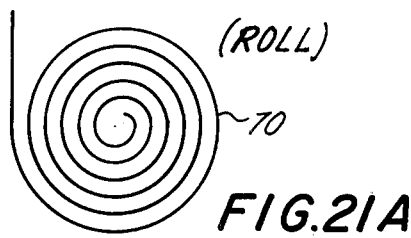
FIG. 21A is a diagrammatic lateral view of the strip of either FIG. 20 or FIG. 20A, being formed into a rolled belt of staples.

The strip produced by the method diagrammatically represented in FIGS. 18-20 can be coiled or formed into a roll 70 as shown in FIG. 21A, for use in tackers or staplers that erect the legs of successive staples preparatory to driving the staples. Furthermore, a slight modification may be introduced to provide a conventionally contoured style of staples that are supplied in rolls. As strip 60 emerges from the step represented in FIG. 19, portions of the staples are displaced out of the original sheet-metal strip. Those portions ar pressed back essentially into surface alignment with each other by what has been called a flattening operation. As part of this flattening operation or in a separate operation, the contoured strip 60a may be produced, as shown in FIGS. 20A and 20B. This strip of staples is then coiled into roll 70 (FIG. 21A). In the case of staples that are made of relatively heavy-gage sheet metal, or where the coils has a relatively small radius of inner convolutions, it may be of advantage to use strips of metal 60' grooved in only one surface as shown in FIG. 18B. In that case, the strip is coiled readily with the grooves facing outward. A consequence of using grooves 62' in only one side of the sheet metal is that the resulting staples may have burrs extending along parts of their margins, and in some applications this is of little consequence. Grooving the sheet metal in both of its sufaces avoids such burrs, as amply discussed above.

Figure 22:
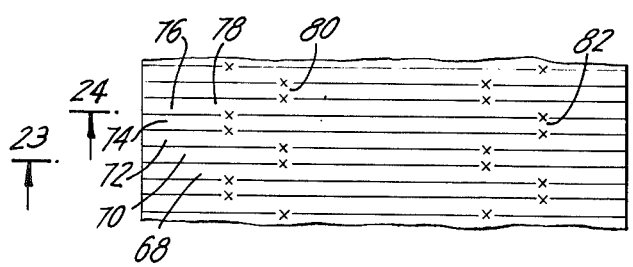
FIG. 22 is an enlarged plan view of a modification of the parted strip of FIG. 19.
Figure 23:
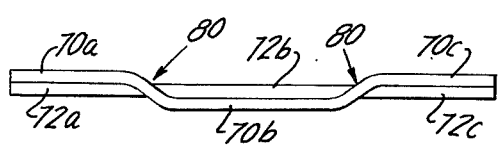
FIGS. 23 and 24 are cross-sections of FIG. 22 at the planes 23—23 and 24—24 in FIG. 22.
Figure 24:
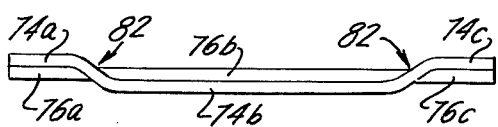

FIGS. 22-24 illustrate a modification of the parting operation that is applicable to the embodiments of FIGS. 1-10 and to FIGS. 18-21 and to the modifications of those Figures. It will be recalled (see FIGS. 3A and 10) that each elongated portion of each strip in the previously described embodiments is shifted (a) out of the original plane of the sheet metal; and (b) the elongated portions of neighboring portions of the staples are shifted out of surface alignment with each other. In that procedure, each elongated portion of each staple is displaced. However, it is possible to allow every other staple elements in a row to remain flat, and to deform only the other alternating staples in the row, as shown in FIGS. 22-24. Furthermore, where the tiny connections between the staples of FIGS. 1-10 were all aligned as at 26 in FIG. 9, and this is a desirable detail, the connections need not be aligned, as demonstrated by FIGS. 22-24.

Elements 68, 70, 72, 74, 76 and 78 are formed of sheet metal, and are initially dilineated by grooves, preferably paired and oppositely aligned grooves as shown in FIGS. 7 and 18A. In FIGS. 22-24, elements 68, 72, and 78 are allowed to remain essentially undeformed. Nevertheless, each pair of elongated laterally adjacent or neighboring portions of those staple elements is deflected relative to its neighbor sufficiently to part them from each other and to form abrupt "cross-overs" 80 and 82. At each cross-over, a small cross-section of metal remains to connect the neighboring staple elements to each other, at points designated by a tiny "X" in FIG. 22. Elongated portions 70a and 70c are pushed upward out of surface alignment with the unshifted portions 72a and 72c, and portion 70b is shifted downward out of surface alignment with its neighboring portion 72b. Correspondingly portions 74a and 74c are shifted upward out of surface alignment with unshifted portions 76a and 76c and out of alignment with unshifted portions 72a and 72c, while portion 74b is shifted downward out of alignment with its neighboring unshifted portions 76b and 72b. Each of the displaced center portions 70b, 74b is stretched or elongated slightly. Following this operation, the staple strip is flattened, restoring the displaced portions into substantial surface alignment with their neighboring undisplaced portions. The flattening of the elongated portions 70b and 74b not only twists the integral connections "X" at the cross-overs, but imposes a shear stress. Consequently, those connections tend to be weaker than in the embodiments of FIGS. 1–21. However, by making the cross-overs less abrupt and therefore longer, the cross-section of the integral metal connections can be made larger than in FIGS. 1–21 and thus equal in strength. Advantageously, the extent of displacement of each elongated portion can be restricted to be only that needed to effect parting. In FIGS. 21 and 22 the displaced elongated portions are shown as having been displaced a distance equal to the full thickness of the sheet metal, and that would entail a relatively large amount of stretching of staple portion 70b, for example. Recalling that the grooves leave intact about one-third to one-fourth of the sheet metal thickness, the displacement of portion 70b can be much less than the sheet metal thickness. The extent of shift needed for parting depends on the ductility of the metal, so that parting of each elongated element from its neighboring could well occur with a one-fourth-thickness displacement or even less. Under such conditions, very little elongation of elongated portion 70b would be required. In that case, the process in FIGS. 22–24 of deforming only the alternate staple elements in the strip would have only a minimal shearing effect on the integral connections as a result of the subsequent flattening operation.

The grooves of FIG. 1 are impressed concurrently, whether done by rolling or by a reciprocating die. This differs in one respect from grooving across a strip by means of rollers. Where grooves are formed concurrently, especially by reciprocating dies, the sheet metal is confined by the grooving edges against spreading or becoming enlarged; and in that case, the amount of metal raised out of the grooves is larger than (for example) where grooves across the strip are made by rollers whose grooving edges penetrate the sheet metal surface successively and tend to elongate the strip of metal. Various amounts of metal are raised out of the grooves by the different kinds of grooving operations. Where the grooves are close-spaced (as in FIGS. 1 and 18) the raised metal tends to create a cross-section of metal that is of "dog-bone" shape, providing increased stiffness in the prongs. Where the cold-flow grooving is of a type that prevents spreading of the sheet metal during the grooving operation, this stiffening effect is greater than where spreading is allowed, and greater than where grooving is done by a cutting or shaving operation.

Staples of a wide range of sizes that are available commercially can be made by the above method and its modifications. Accordingly, the sheet metal used may be about 0.013 to 0.080 inch thick. Rows of staples can be made of sheet metal as described above having localized connections that are much smaller in a cross-sectional area than the square of the thickness of the sheet metal. The recommended cross-section of the integral connections is in the range of 0.000015 square inch for sheet metal of 0.013 inch thickness to about 0.00006 square inch for sheet metal of 0.080 inch thickness. That cross-section is also variable in relation to the kind of staple driver for which the staples are designed. Thus, for hand-powered staplers, the cross-section of the integral connections should be at the lower part of the above range. Staples having integral connections of 0.00003 square inch for sheet metal 0.018 to 0.020 inch thick in the specific example mentioned above are suitable for use in hand-driven staplers. Larger areas of connection are acceptable in the case of staplers operated pneumatically, and in hammer staplers. In any case, the isolated integral connections of limited cross-section in the novel staples avoid excessive demands on the operating effort of the staplers, and they do not depend on staple drivers having sharp cutting edges.

It has been noted above that the cold-flow grooving of the sheet metal develops staple elements whose cross-section resembles a "dog-bone" shape. Some of this effect may be reduced by a flattening effect of the tools that part neighboring staple elements from one another, and yet some of the thickening along the margins of the staples usually persists. Accordingly, the cross-section of the staple portions which is illustrated diagrammatically as being uniform in FIGS. 3B, 8 and 12–16, retains some of the "dog-bone" characteristic in usual practice.

The foregoing illustrative embodiment of the novel staples and the novel method of making staples, and the modifications, as described above and shown in the accompanying drawings are of course subject to a latitude of further modification by those skilled in the art, and the novel concepts and aspects of the invention are readily adapted to varied applications. Consequently, the invention should be construed broadly in accordance with its full spirit and scope.

What is claimed is:

1. The method of making staples, including the steps of modifying sheet metal to define the outlines of a succession of staples, the modification including the step of forming parallel grooves defining at least part of the lateral margins of the staples, shifting successive first, second and third portions of each defined staple in opposite directions out of the plane of the sheet metal while shifting the first, second and third portions of each staple in opposite directions in relation to the first, second and third portions, respectively, of its neighboring staples sufficiently to part the relatively shifted portions and leaving neighboring staples connected to each other at only two grooved locations situated respectively between said first and second portions and between said second and third portions of each neighboring pair of staples, the first, second and third portions of each staple being so close to one another that relatively shifting the neighboring staples as aforesaid leaves each staple and its neighbor connected only by grooved and twisted metal at said two locations, restoring lateral alignment of the respective portions of successive staples, and making two bends in each said second portion to define a crown and a pair of at least partially erect legs extending from the crown with the connections between successive staples located along the legs thereof.

2. The method of making staples as in claim 1, wherein said grooves are formed all along the lateral margins of the staples.

3. The method of making staples as in claim 2 wherein the formation of said grooves comprises forming grooves in each surface of the sheet metal aligned with the grooves in the opposite surface of the sheet metal.

4. The method of making staples in accordance with claim 1, wherein formation of said grooves comprises forming grooves in each surface of the sheet metl aligned with the grooves in the opposite surface of the sheet metal.

5. The method of making staples in accordance with claim 1, wherein said sheet metal is a strip and wherein said grooves are formed so as to extend across the length of the strip.

6. The method of making staples in accordance with claim 1, wherein said sheet metal is a strip and wherein said grooves are formed so as to extend across the length of the strip, and wherein the staple outline includes prongs having their free ends at the edges of the strip.

7. The method of making staples in accordance with claim 1, wherein said sheet metal is a strip and wherein said parallel grooves are formed so as to extend along the strip, and wherein said modification includes forming the free ends of the prongs of successive groups of staples along lines crossing the strip.

8. The method of making staples in accordance with claim 1, wherein said sheet metal is a strip and wherein said parallel grooves are formed so as to extend along the strip, and wherein said modification includes forming the free ends of the prongs of successive groups of stables along lines crossing the strip.

9. The method of making staples in accordance with claim 1, wherein formation of said grooves comprises forming grooves in each surface of the sheet metal aligned with the grooves in the opposite surface of the sheet metal.

10. The method of making staples in accordance with claim 1, wherein the closeness of said portions of each staple and the remaining thickness of metal at each groove are related to yield connections of approximately 0.000015 to 0.00008 square inch.

11. A row of metal staples, each staple and the next in the row having elongated lateral surfaces substantially in abutment with each other but disconnected from each other, each staple and the next in the row having a crown and a pair of legs extending from the ends of the crown at least partially erect therefrom; and having one localized integral connection interrupting said lateral surfaces of each leg of each staple and corresponding legs of the neighboring staples, said row of staples being formed by the method including the steps of modifying sheet metal to define the outlines of a succession of staples, the modification including the step of forming parallel grooves defining at least part of the lateral margins of the staples, shifting successive first, second and third portions of each defined staple in opposite directions out of the plane of the sheet metal while shifting the first, second and third portions of each staple in opposite directions in relation to the first, second and third portions, respectively, of its neighboring staples sufficiently to part the relatively shifted portions and leaving neighboring staples connected to each other at only two grooved locations situated respectively between said first and second portions and between said second and third portions of each neighboring pair of staples, the first, second and third portions of each staple being so close to one another that relatively shifting the neighboring staples as aforesaid leaves each staple and its neighbor connected only by grooves and twisted metal at said two locations, restoring lateral alignment of the respective portions of successive staples, and making two bends in each said second portion to define a crown and a pair of at least partially erect legs extending from the crown with the connections between successive staples located along the legs thereof.

12. A row of staples as in claim 11, wherein the step of forming grooves as aforesaid includes forming grooves in each surface of the sheet metal aligned with the grooves in the opposite surface of the sheet metal for rendering said elongated lateral surfaces free of burrs.

13. A row of metal staples in accordance with claim 11 wherein each staple has a crown and at least one elongated prong extending from each of the opposite ends of the crown, the crowns of successive staples in the row substantially abutting each other all along their lateral surfaces and the prongs of successive staples in the row substantially abutting each other all along their lengths, such abutment being interrupted by said integral connecting means.

14. A row of staples in accordance with claim 11 wherein the thickness of said staples measured perpendicular to the row is in the range of about 0.013 to 0.080 inch and wherein each localized connection has a cross-section of about 0.000015 to 0.00006 square inch.

15. A row of staples in accordance with claim 11 wherein the thickness of said staples measured perpendicular to the row is in the range of about 0.013 to 0.080 inch and wherein each localized connection has a cross-section of about 0.000015 to 0.00006 square inch.

16. A row of metal staples in accordance with claim 1 wherein opposed grooves partially define said localized connecting means between each staple and the next in the row.

17. A row of metal staples in accordance with claim 11 wherein said prongs of each staple project at least approximately at right angles from the crown of its respective staple and said row consists of a stick comprising a large number of staples.

18. A row of metal staples in accordance with claim 11 wherein the cross-section of each said integral connection is approximately 0.00003 square inch.

19. The method of making staples in accordance with claim 1 wherein said forming of grooves is performed by causing cold-flow of metal.

* * * * *